United States Patent Office 3,541,117
Patented Nov. 17, 1970

3,541,117
3-OXIME AND 3-AZA STEROIDS
Arvin Pranlal Shroff, Piscataway, N.J., assignor to Ortho Pharmaceutical Corporation, a corporation of New Jersey
No Drawing. Division of application Ser. No. 592,295, Nov. 7, 1966, now Patent No. 3,455,903. Continuation-in-part of applications Ser. No. 412,828, Nov. 20, 1964, and Ser. No. 424,184, Jan. 8, 1965. This application Aug. 12, 1968, Ser. No. 772,874
Int. Cl. C07c 169/20
U.S. Cl. 260—397.4
12 Claims

ABSTRACT OF THE DISCLOSURE

Compounds having the formula

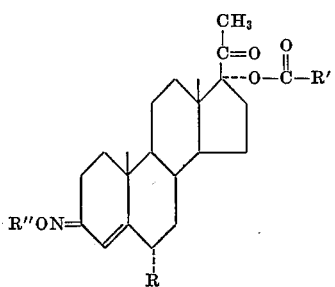

wherein R is hydrogen, lower alkyl of 1 to 4 carbon atoms, chlorine, bromine or fluorine. R' is hydrogen or alkyl from 1 to 11 carbon atoms and R" is hydrogen or lower acyl of up to 10 carbon atoms which are progestational agents and, in particular possess anti-ovulatory activity.

---

This application is a continuation-in-part of my previously filed application Ser. No. 412,828, filed Nov. 20, 1964 and Ser. No. 424,184, filed Jan. 8, 1965, both now abandoned and a division of Ser. No. 592,205, filed Nov. 7, 1966, now Pat. No. 3,455,903.

The present invention relates to steroidal 3-oximes and 3-aza-A-homo steroids. Specifically, the new compounds may be represented by the following structural formulae:

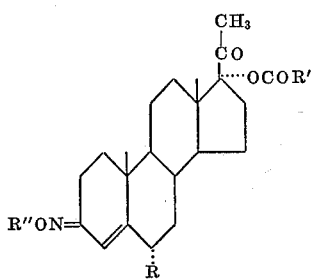

and

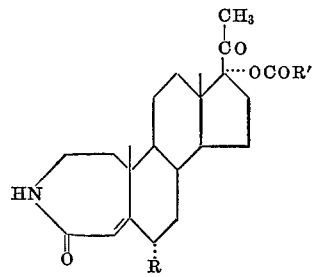

wherein R is hydrogen, lower alkyl of 1 to 4 carbon atoms, chlorine, bromine or fluorine, R' is hydrogen or alkyl from 1 to 11 carbon atoms, and R" is hydrogen or lower acyl of up to 10 carbon atoms.

The 3-oximes, acylated 3-oximes and 3-aza compounds of the present invention have activity as progestational agents, and more particularly, possess anti-ovulatory activity.

Steroidal oximes can conventionally be prepared by reaction of a carbonyl group on the steroid with a hydroxylamine salt in the presence of a base such as pyridine, sodium hydroxide or sodium acetate.

When a steroid having a carbonyl group at the 3- and 20-positions is subjected to treatment with a hydroxylamine salt under basic conditions, the dioxime would be the expected product. Due to the presence of a 17-ester group in the starting compounds from which the oximes of this invention are prepared, steric hindrance prevents the oximation of the 20-carbonyl. The 17-ester can be readily converted to the alcohol by hydrolysis.

The oxime is subjected to Beckmann rearrangement in the presence of an acidic reagent to form the corresponding 3-aza-A-homo steroid. Typical acidic reagents which may be used are thionyl chloride, polyphosphoric acid, p-toluenesulfonyl chloride, p-acetylaminobenzene-sulfonyl chloride, p-aminobenzenesulfonyl chloride and phosphorus pentachloride.

The oxime at the 3-position is esterified by treating the starting material with an organic acid chloride or acid anhydride such as acetyl chloride, acetic anhydride, propionyl chloride, propionoic anhydride, n-butyryl chloride, n-butyric anhydride, isobutyryl chloride, isobutyric anhydride, capryl chloride, caproic anhydride, pelargonyl chloride, pelargonic anhydride, benzoyl chloride, benzoic anhydride, etc.

As starting materials for the preparation of the oximes, there are used compounds of the structural formula:

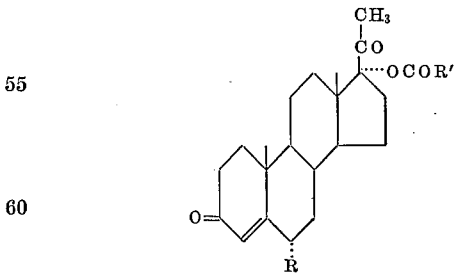

wherein R is hydrogen, lower alkyl of 1 to 4 carbon atoms, chlorine, bromine or fluorine, and R' is alkyl from 1 to 11 carbon atoms.

The following examples illustrate the invention:

EXAMPLE I

17α-acetoxy-pregn-4-en-3,20-dion-3-oxime 1.0 gram of 17α-acetoxy progesterone was treated with 250 mg. of hydroxylamine hydrochloride and 5 ml. of pyridine. The reaction mixture was heated on a steam bath for one-half hour and then poured into 100 ml. of ice water. The crude oxime was filtered and recrystallized from methanol to yield 1.0 gram of 17α-acetoxy-pregn-4-en-3,20-dion-3-oxime having a melting point of 240–241° C.

Calculated for $C_{23}H_{33}NO_4$.—Theory (percent): C, 71.29; H, 8.58; N, 3.61. Found (percent): C, 71.02; H, 8.81; N, 3.93.

EXAMPLE II

17α-propionoxy-pregn-4-en-3,20-dion-3-oxime

Following the procedure of Example I, 17α-propionoxy progesterone yielded 17α-propionoxy-pregn-4-en-3,20-dion-3-oxime having a melting point of 205–209° C.

Calculated for $C_{24}H_{35}NO_4$.—Theory (percent): C, 71.79; H, 8.79; N, 3.49. Found (percent): C, 71.72; H, 8.73; N, 3.65.

EXAMPLE III

17α-caproxy-pregn-en-3,20-dion-3-oxime

Following the procedure of Example I, 17α-caproxy progesterone yielded 17α-caproxy-pregn-4-en-3,20-dion-3-oxime having a melting point of 189–192° C.

Calculated for $C_{27}H_{41}NO_4$.—Theory (percent): C, 73.10; H, 9.32; N, 3.16. Found (percent): C, 73.18; H, 9.61; N, 3.25.

EXAMPLE IV

6α-methyl-17α-acetoxy-pregn-4-en-3,20-dion-3-oxime

Following the procedure of Example I, 6α-methyl-17α-acetoxy progesterone yields 6α-methyl-17α-acetoxy-pregn-4-en-3,20-dion-3-oxime having a melting point of 215–218° C.

Calculated for $C_{24}H_{35}NO_4$.—Theory (percent): C, 71.79; H, 8.79; N, 3.49. Found (percent): C, 71.78; N, 8.91; N, 3.61.

EXAMPLE V

6α-methyl-17α-propionoxy-pregn-4-en-3,20-dion-3-oxime

Following the procedure of Example I, 6α-methyl-17α-propionoxy progesterone yields 6α-methyl-17α-propionoxy-pregn-4-en-3,20-dion-3-oxime having a melting point of 122–124° C.

Calculated for $C_{25}H_{37}NO_4$.—Theory (percent): C, 72.25; H, 8.98; N, 3.37. Found (percent): C, 72.43; H, 9.13; N, 3.49.

EXAMPLE VI

6α-methyl-17α-caproxy-pregn-4-en-3,20-dion-3-oxime

Following the procedure of Example I, 6α-methyl-17α-caproxy progesterone yields 6α-methyl-17α-caproxy-pregn-4-en-3,20-dion-3-oxime having a melting point of 97–98° C.

Calculated for $C_{28}H_{43}NO_4$.—Theory (percent): C, 73.48; H, 9.47; N, 3.06. Found (percent): C, 72.98; H, 9.56; N, 3.55.

Utilizing the method of Example I, the following related compounds are prepared starting from the appropriate progesterone:

17α-undecyloxy-pregn-4-en-3,20-dion-3-oxime,
6α-methyl-17α-undecyloxy-pregn-4-en-3,20-dion-3-oxime,
6α-ethyl-17α-acetoxy-pregn-4-en-3,20-dion-3-oxime,
6α-propyl-17α-acetoxy-pregn-4-en-3,20-dion-3-oxime,
6α-chloro-17α-propionoxy-pregn-4-en-3,20-dion-3-oxime,
6α-bromo-17α-caproxy-pregn-4-en-3,20-dion-3-oxime,
6α-fluoro-17α-acetoxy-pregn-4-en-3,20-dion-3-oxime.

EXAMPLE VII 3-aza-17α-acetoxy-A-homo-4a-pregnen-4,20-dione 4.0 grams of 17α-acetoxy-pregn-4-en-3,20-dion-3-oxime was dissolved in 30 ml. of dioxane and treated with 5.0 ml. of thionyl chloride. The brown solution was stirred at room temperature for one and one-half hours. The reaction mixture was poured into an excess of ice water and extracted with methylene chloride. The methylene chloride layer was washed with sodium bicarbonate solution until neutral. The organic layer was again washed with water and dried over sodium sulfate. On evaporation, it gave a brown oil which was recrystallized from acetone-hexane. The crystals were washed with cold ether to yield 1.4 grams of 3-aza-17α-acetoxy-A-homo-4a-pregnen-4,20-dione having a melting point of 274–277° C.

Calculated for $C_{23}H_{33}NO_4$.—Theory (percent): C, 71.29; H, 8.58; N, 3.61. Found (percent): C, 71.53; H, 8.61; N, 3.80.

EXAMPLE VIII 3-aza-6α-methyl-17α-acetoxy-A-homo-4a-pregnen-4,20-dione

Following the procedure of Example VII, 6α-methyl-17α-acetoxy-pregn-4-en-3,20-dion-3-oxime yields 3-aza-6α-methyl-17α-acetoxy-A-homo-4a-pregnen-4,20-dione having a melting point of 184–186° C.

Calculated for $C_{24}H_{35}NO_4$.—Theory (percent): C, 71.79; H, 8.79; N, 3.49. Found (percent): C, 71.18; H, 8.77; N, 3.59.

Utilizing the method of Example VII, the following related compounds are prepared starting from the appropriate 3-oxime.

3-aza-17α-propionoxy-A-homo-4a-pregnen-4,20-dione,
3-aza-17α-caproxy-A-homo-4a-pregnen-4,20-dione,
3-aza-17α-undecyloxy-A-homo-4a-pregnen-4,20-dione,
3-aza-6α-methyl-17α-propionoxy-A-homo-4a-pregnen-4,20-dione,
3-aza-6α-methyl-17α-caproxy-A-homo-4a-pregnen-4,20-dione,
3-aza-6α-ethyl-17α-acetoxy-A-homo-4a-pregnen-4,20-dione,
3-aza-6α-propyl-17α-acetoxy-A-homo-4a-pregnen-4,20-dione,
3-aza-6α-chloro-17α-propionoxy-A-homo-4a-pregnen-4,20-dione,
3-aza-6α-fluoro-17α-acetoxy-A-homo-4a-pregnen-4,20-dione,
3-aza-6α-bromo-17α-caproxy-A-homo-4a-pregnen-4,20-dione,
3-aza-6α-methyl-17α-undecyloxy-A-homo-4a-pregnen-4,20-dione.

EXAMPLE IX 3,17α-diacetoxy-6α-methyl-pregn-4-en-3,20-dion-3-oxime 500 mg. of 17α-acetoxy-6α-methyl-pregn-4-en-3,20-dion-3-oxime is treated with 1.5 ml. of acetic anhydride and 0.7 ml. of pyridine. The mixture is stirred for ten minutes and poured over ice water. Crude crystals are formed which are collected by filtration and recrystallized from aqueous methanol to yield 485 mg. (88%) of 3,17α-diacetoxy-6α-methyl-pregn-4-en-3,20-dion-3-oxime having a melting point of 104–107° C.

Calculated for $C_{26}H_{37}NO_5$.—Theory (percent): C, 70.40; H, 8.41; N, 3.16. Found (percent): C, 69.83; H, 8.87; N, 3.21.

EXAMPLE X 3-propionoxy-17α-acetoxy-6α-methyl-pregn-4-en-3,20-dion-3-oxime 1.0 gram of 17α-acetoxy-6α-methyl-pregn-4-en-20-one-3-oxime is treated with 1.5 ml. of pyridine and 3.0 ml. of propionic anhydride. The mixture is stirred for 15 minutes at room temperature and is added to ice water. The mixture is neutralized with ammonium hydroxide and filtered.

The precipitates are recrystallized from methanol-water to yield 1.2 grams (96.5%) of 3-propionoxy-17α-acetoxy-6α-methyl-pregn-4-en-20-one-3-oxime having a melting point of 81–85° C.

Calculated for $C_{27}H_{39}NO_5$.—Theory (percent): C, 70.86; H, 8.59; N, 3.06. Found (percent): C, 70.58; H, 8.73; N, 3.14.

EXAMPLE XI 3-caproxy-17α-acetoxy-6α-methyl-pregn-4-en-3,20-dion-3-oxime

Following the procedure of Example X, and using caproic anhydride as the sterifying agent, there is yielded 1.4 gram (97%) of 3-caproxy-17α-acetoxy-6α-methyl-pregn-4-en-20-one-3-oxime having a melting point of 105–108° C.

Calculated for $C_{30}H_{45}NO_5$.—Theory (percent): C, 72.11; H, 9.98; N, 2.80. Found (percent): C, 71.92; H, 9.17; N, 2.96.

EXAMPLE XII 3-benzoyloxy-17α-acetoxy-6α-methyl-pregn-4-en-3,20-dion-3-oxime

Following the procedure of Example X, and using benzoic anhydride as the esterifying agent, there is yielded 1.0 gram (79.4%) of 3-benzoyloxy-17α-acetoxy-6α-methyl-pregn-4-en-20-one-3-oxime having a melting point of 190–193° C.

Calculated for $C_{31}H_{39}NO_5$.—Theory (percent): C, 73.63; H, 7.77; N, 2.77. Found (percent): C, 73.77; H, 7.71; N, 2.80.

Similarly, utilizing the preparative methods of Examples IX and X, the following related compounds can be prepared, starting from the appropriate 3-oxime and acid chloride or acid anhydride:

3,17α-diacetoxy-6α-ethyl-pregn-4-en-3,20-dion-3-oxime,
3,17α - diacetoxy - 6α - fluoro - pregn - 4-en-3,20-dion-3-oxime,
3 - propionoxy - 17α - acetoxy-6α-fluoro-pregn-4-en-3,20-dion-3-oxime,
3 - caproxy - 17α - propionoxy - 6α - bromo-pregn-4-en-3,20-dion-3-oxime,
3 - decyloxy - 17α - propionoxy - 6α - methyl - pregn - 4-en-3,20-dion-3-oxime.

What is claimed is:
1. A compound of the formula

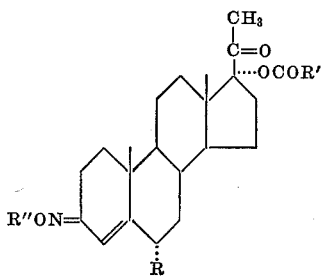

wherein R is selected from the group consisting of hydrogen, alkyl of 1 to 4 carbon atoms, chlorine, bromine and fluorine, R′ is selected from the group consisting of hydrogen and alkyl or 1 to 11 carbon atoms, and R″ is selected from the group consisting of hydrogen and lower acyl of up to 10 carbon atoms.

2. 17α-acetoxy-pregn-4-en-3,20-dion-3-oxime according to claim 1.
3. 17α - propionoxy - pregn - 4 - en - 3,20 - 3 - oxime according to claim 1.
4. 17α - caproxy - pregn - 4 - en - 3,20 - dion - 3-oxime according to claim 1.
5. 6α - methyl - 17α - actoxy - pregn - 4 - en - 3,20-dion-3-oxime according to claim 1.
6. 6α - methyl - 17α - propionoxy - pregn - 4 - en-3,20-dion-3-oxime according to claim 1.
7. 6α - methyl - 17α - caproxy - pregn - 4 - en - 3,20-dion-3-oxime according to claim 1.
8. 3,17α - diacetoxy - 6α - methyl - pregn - 4 - en-3,20-dion-3-oxime according to claim 1.
9. 3 - propionoxy - 17α - acetoxy - 6α - methyl - pregn-4-en-3,20-dion-3-oxime according to claim 1.
10. 3 - caproxy - 17α - acetoxy - 6α - methyl - pregn-4-en-3,20-dion-3-oxime according to claim 1.
11. 3 - benzoyloxy - 17α - acetoxy - 6α - methyl - pregn-4-en-3,20-dion-3-oxime according to claim 1.
12. A method of preparing compounds of the formula

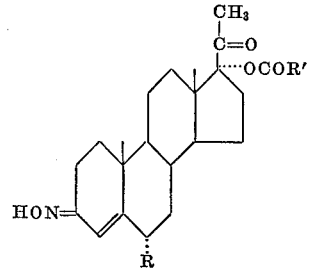

wherein R is selected from the group consisting of hydrogen, alkyl of from 1 to 4 carbon atoms, chlorine, bromine and fluorine, and R′ is selected from the group consisting of hydrogen and alkyl of from 1 to 11 carbon atoms, which comprises reacting a compound of the formula

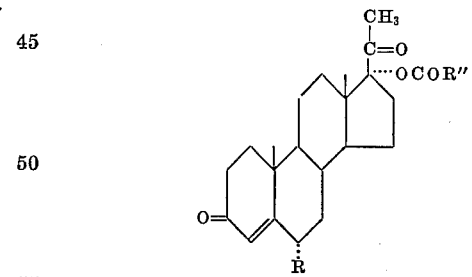

wherein R has the above meaning, and R″ is selected from the group consisting of alkyl of from 1 to 11 carbon atoms with a hydroxylamine salt in the presence of a base, and, if desired, hydrolyzing the resultant product.

No references cited.

ELBERT L. ROBERTS, Primary Examiner

PO-1050
(5/69)

UNITED STATES PATENT OFFICE
CERTIFICATE OF CORRECTION

Patent No. 3,541,117            Dated    November 17, 1970

Inventor(s)   Arvin Pranlal Shroff

It is certified that error appears in the above-identified patent and that said Letters Patent are hereby corrected as shown below:

In Column 3, line 42, "N" should read --H--. In Column 5, line 18, "9.98" should read --9.08--. In Claim 3, line 1, insert --dion-- after "3,20".

SIGNED AND
SEALED
FEB 2 1971

(SEAL)
Attest:

Edward M. Fletcher, Jr.
Attesting Officer

WILLIAM E. SCHUYLER, JR.
Commissioner of Patents